(12) United States Patent
Tsai

(10) Patent No.: US 10,759,221 B1
(45) Date of Patent: Sep. 1, 2020

(54) CASTER DEVICE

(71) Applicant: Po-Chuan Tsai, Tainan (TW)

(72) Inventor: Po-Chuan Tsai, Tainan (TW)

( * ) Notice: Subject to any disclaimer, the term of this patent is extended or adjusted under 35 U.S.C. 154(b) by 0 days.

(21) Appl. No.: 16/406,865

(22) Filed: May 8, 2019

(51) Int. Cl.
*B60B 33/00* (2006.01)

(52) U.S. Cl.
CPC ...... *B60B 33/0094* (2013.01); *B60B 33/0028* (2013.01); *B60B 33/0042* (2013.01); *B60B 33/0055* (2013.01)

(58) Field of Classification Search
CPC . Y10T 16/195; Y10T 16/196; B60B 33/0028; B60B 33/0055; B60B 33/0094; B60B 33/0039; B60B 33/0049; B60B 33/0084; B60B 33/0092; B60B 33/025; B60B 33/021; B60B 33/0042; B60B 33/0078; B60B 33/0086; B60B 37/10; B60B 2200/222; B60B 2900/531; A61G 7/0528
See application file for complete search history.

(56) References Cited

U.S. PATENT DOCUMENTS

| | | | | |
|---|---|---|---|---|
| 4,212,092 A | * | 7/1980 | Ferrari | B60B 33/021 16/35 R |
| 5,355,550 A | * | 10/1994 | Yang | B60B 33/0002 16/35 R |
| 5,368,133 A | * | 11/1994 | Yang | B60B 33/0042 16/35 R |
| 5,537,715 A | * | 7/1996 | Yang | B60B 33/0042 16/35 R |
| 5,617,934 A | * | 4/1997 | Yang | B60B 33/0042 16/35 R |
| 6,256,835 B1 | * | 7/2001 | Wang | B60B 33/001 16/35 D |
| 10,099,511 B2 | * | 10/2018 | Ma | B60B 33/0086 |
| 2001/0039693 A1 | * | 11/2001 | Melara | B60B 33/0028 16/35 R |
| 2005/0108851 A1 | * | 5/2005 | Dayt | B60B 33/0068 16/31 R |
| 2009/0113671 A1 | * | 5/2009 | Chu | B60B 33/025 16/35 R |

FOREIGN PATENT DOCUMENTS

| | | | | |
|---|---|---|---|---|
| JP | 09315104 A | * | 12/1997 | ............. A47C 7/006 |
| JP | 3204364 U | * | 6/2016 | |
| WO | WO-2017190386 A1 | * | 11/2017 | ............. B60B 33/00 |

* cited by examiner

*Primary Examiner* — Chuck Y Mah

(57) ABSTRACT

A caster device includes a support unit, two caster wheels, a resilient member, two friction wheels, and two protruding teeth units. Each of the caster wheels has an inner wheel surface and a plurality of meshing teeth that are angularly arranged and that are formed on the inner wheel surface. Each of the protruding teeth units includes a plurality of protruding teeth. The support unit is downwardly movable against a resilient force of the resilient member to a stop position, where each of the friction wheels is in frictional contact with the meshing teeth of a respective one of the caster wheels, and where the protruding teeth of each of the protruding teeth units are meshed with the meshing teeth of the respective one of the caster wheels.

8 Claims, 5 Drawing Sheets

CASTER DEVICE

FIELD

The disclosure relates to a caster device, and more particularly to a furniture caster device.

BACKGROUND

Conventionally, a plurality of caster devices are mounted at bottom of a piece of furniture, such as bottom of a chair, for enabling rolling movement of the piece of furniture. For convenience's sake, in an office setting, the chair is able to move via the rolling movement whether or not the chair is supporting a load. However, with an implementation of a brake mechanism on the caster devices, the chair is able to remain stationary and be restricted from the rolling movement when the chair is supporting a load.

SUMMARY

Therefore, an object of the disclosure is to provide a caster device that is restricted from rolling when sustaining a load.

According to the disclosure, the caster device includes a support unit, two caster wheels, a resilient member, two friction wheels and two protruding teeth units that are respectively adjacent to the friction wheels. The caster wheels are spaced apart along an axis that extends in a left-right direction, and are rotatably and respectively mounted to opposite lateral sides of the support unit. Each of the caster wheels is hollow, and has an inner wheel surface that surrounds the axis and a plurality of meshing teeth that are angularly arranged and that are formed on the inner wheel surface. The resilient member is retained in the support unit for biasing the support unit upwardly. The friction wheels are respectively mounted at bottoms of the opposite lateral sides of the support unit, and are respectively proximate to the inner wheel surfaces of the caster wheels. Each of the protruding teeth units includes a plurality of protruding teeth that protrude downwardly.

The support unit is downwardly movable relative to the caster wheels against a resilient force of the resilient member from a released position, where each of the friction wheels is separated from the meshing teeth of a respective one of the caster wheels and where the protruding teeth of each of the protruding teeth units are separated from the meshing teeth of the respective one of the caster wheels, to a stop position, where each of the friction wheels is in frictional contact with the meshing teeth of the respective one of the caster wheels and where the protruding teeth of each of the protruding teeth units are meshed with the meshing teeth of the respective one of the caster wheels to thereby impede the rotation of the caster wheels.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
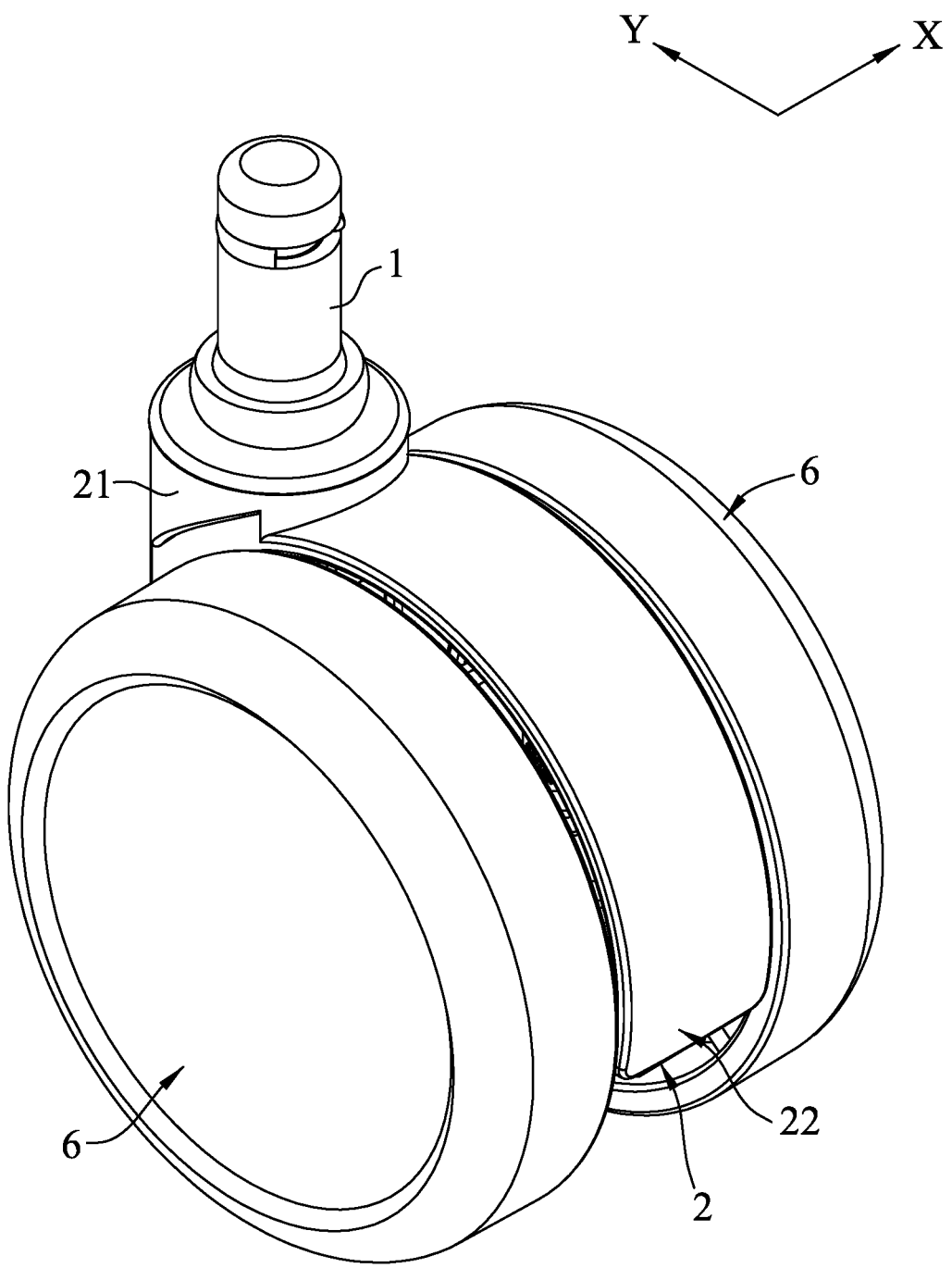
FIG. 1 is a perspective view of an embodiment of a caster device according to the disclosure.
Figure 2:
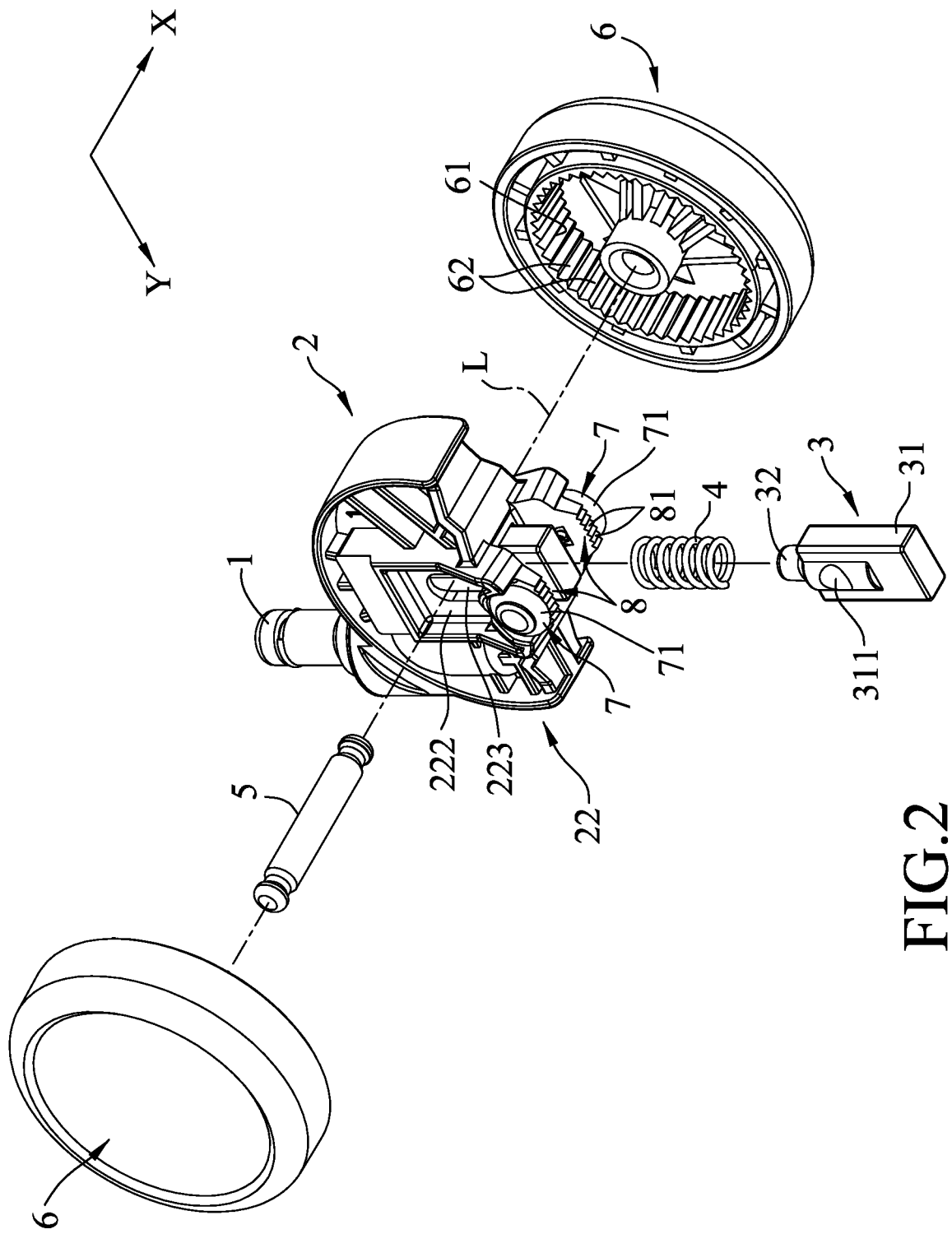
FIG. 2 is an exploded perspective view of the embodiment.

Referring to FIGS. 1 and 2, an embodiment of a caster device according to the disclosure is adapted to be installed to a piece of furniture (a chair in this embodiment) via an installation rod 1, which interconnects a bottom of the piece of furniture and the caster device. The caster device includes a support unit 2, a connecting member 3, a resilient member 4, a wheel axle 5, two caster wheels 6, two friction wheels 7, and two protruding teeth units 8.

Figure 3:
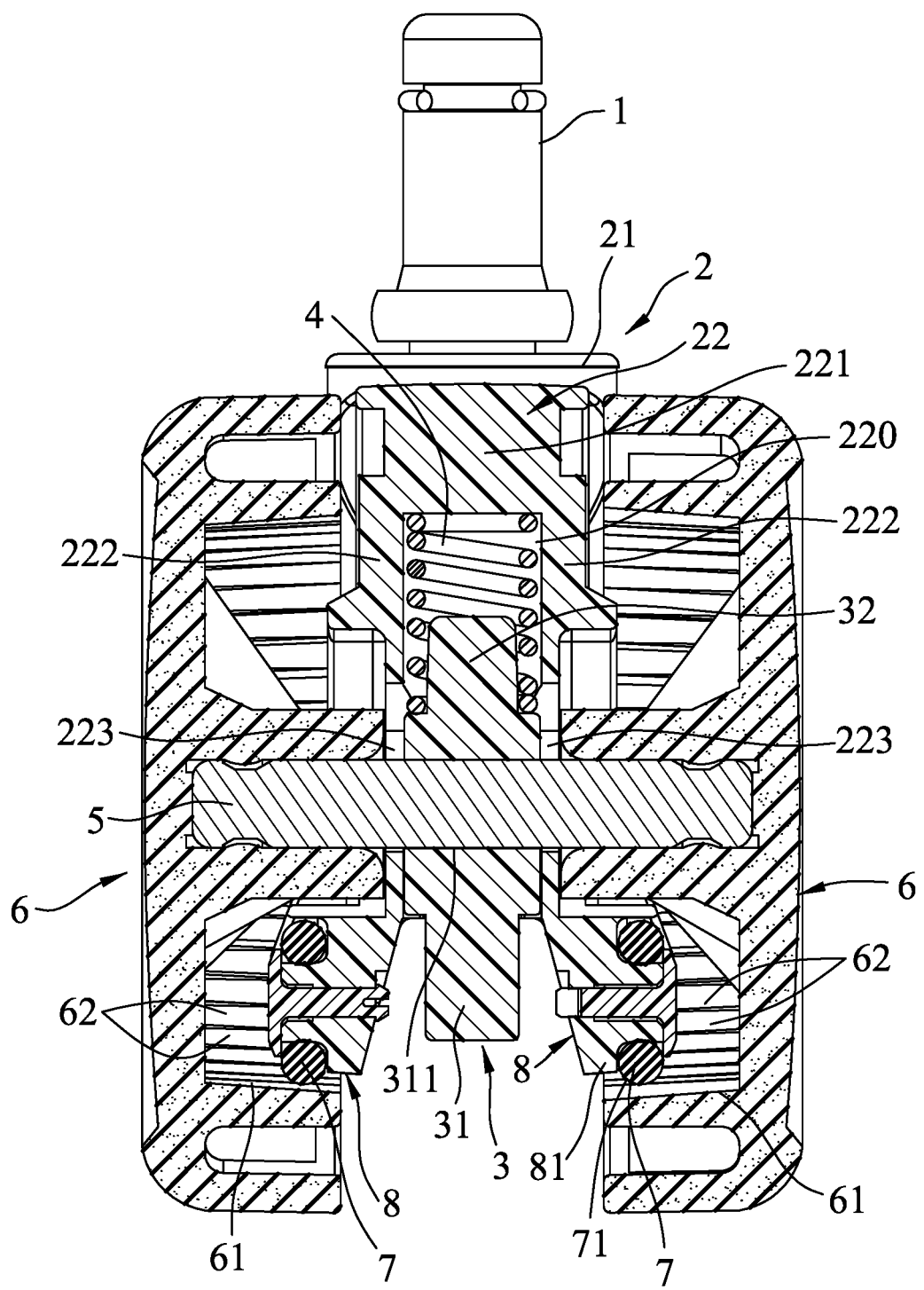
FIG. 3 is a front sectional view of the embodiment.
Figure 4:
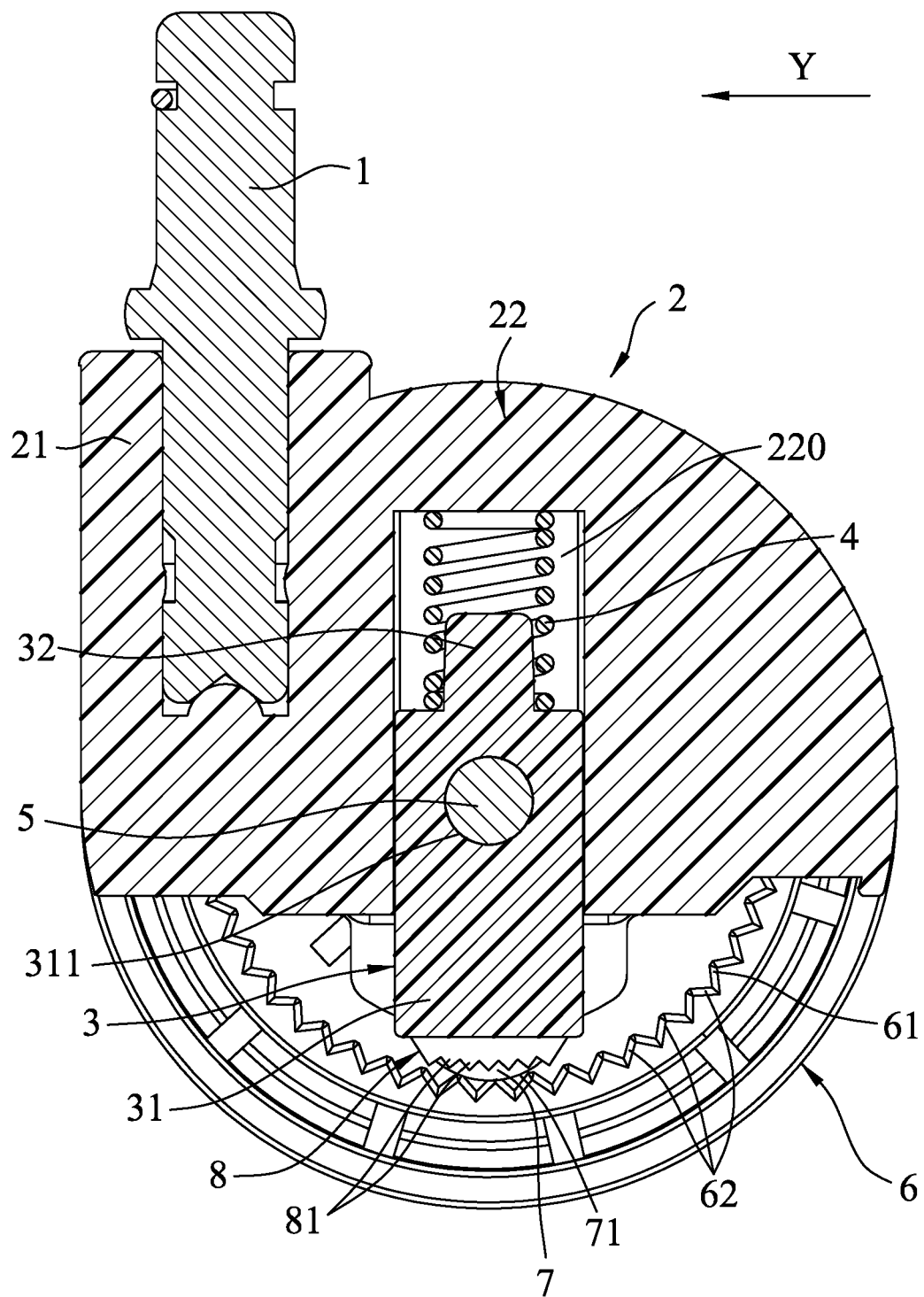
FIG. 4 is a side sectional view of the embodiment, illustrating a support unit in a released position.

Referring to FIGS. 2 to 4, the support unit 2 includes an inserting portion 21 adapted for the installation rod 1 to be inserted therein, and a coupling portion 22 that is connected to the inserting portion 21. The coupling portion 22 has a top wall 221 and two lateral walls 222 that extend downwardly and respectively from lateral ends of the top wall 221 and that cooperate with the top wall 221 to define a coupling groove 220 facing downwardly. Each of the lateral walls 222 is formed with an extension hole 223 that extends therethrough in a left-right direction (X). In this embodiment, the support unit 2 is made of plastics, but is not limited thereto.

The connecting member 3 is inserted upwardly into the coupling groove 220, and includes a connecting body 31 and an extended body 32 that extends upwardly from a top surface of the connecting body 31. The connecting body 31 is formed with a through hole 311 that is registered with the extension holes 223.

The resilient member 4 is retained in the coupling groove 220 of the support unit 2, and surrounds the extended body 32 of the connecting member 3. In this embodiment, the resilient member 4 is a compressible spring, and is retained between a top surface of the connecting body 31 of the connecting member 3 and the top wall 221 of the coupling portion 22 of the support unit 2 for biasing the support unit 2 upwardly.

The wheel axle 5 extends through the extension holes 223 of the coupling portion 22 and the through hole 311 of the connecting member 3 along an axis (L) which extends in the left-right direction (X). The wheel axle 5 has two opposite ends that are connected respectively to the caster wheels 6.

The caster wheels 6 are spaced apart along the axis (L), and are rotatably and respectively mounted to opposite lateral sides of the support unit 2 via the wheel axle 5. Each of the caster wheels is hollow, and has an inner wheel surface 61 that surrounds the wheel axle 5, and a plurality of meshing teeth 62 that are angularly arranged and that are formed on the inner wheel surface 61.

The friction wheels 7 are respectively mounted at bottoms of the opposite lateral sides of the support unit 2 (in this embodiment, at bottoms of the opposite lateral walls 222 of the coupling portion 22), and are respectively proximate to the inner wheel surfaces 61 of the caster wheels 6. Each of the friction wheels 7 is made of rubber, and has a curved contact surface 71.

The protruding teeth units 8 are respectively adjacent to the friction wheels 7. Specifically, in this embodiment, the protruding teeth units 8 are disposed between the friction wheels 7. The protruding teeth units 8 may be made of plastics, but are not restricted to such. In addition, the protruding teeth units 8 and the support unit 2 may be molded as one piece. Each of the protruding teeth units 8 includes a plurality of protruding teeth 81 that protrude downwardly and that are arranged in a front-rear direction (Y) perpendicular to the left-right direction (X).

Figure 5:
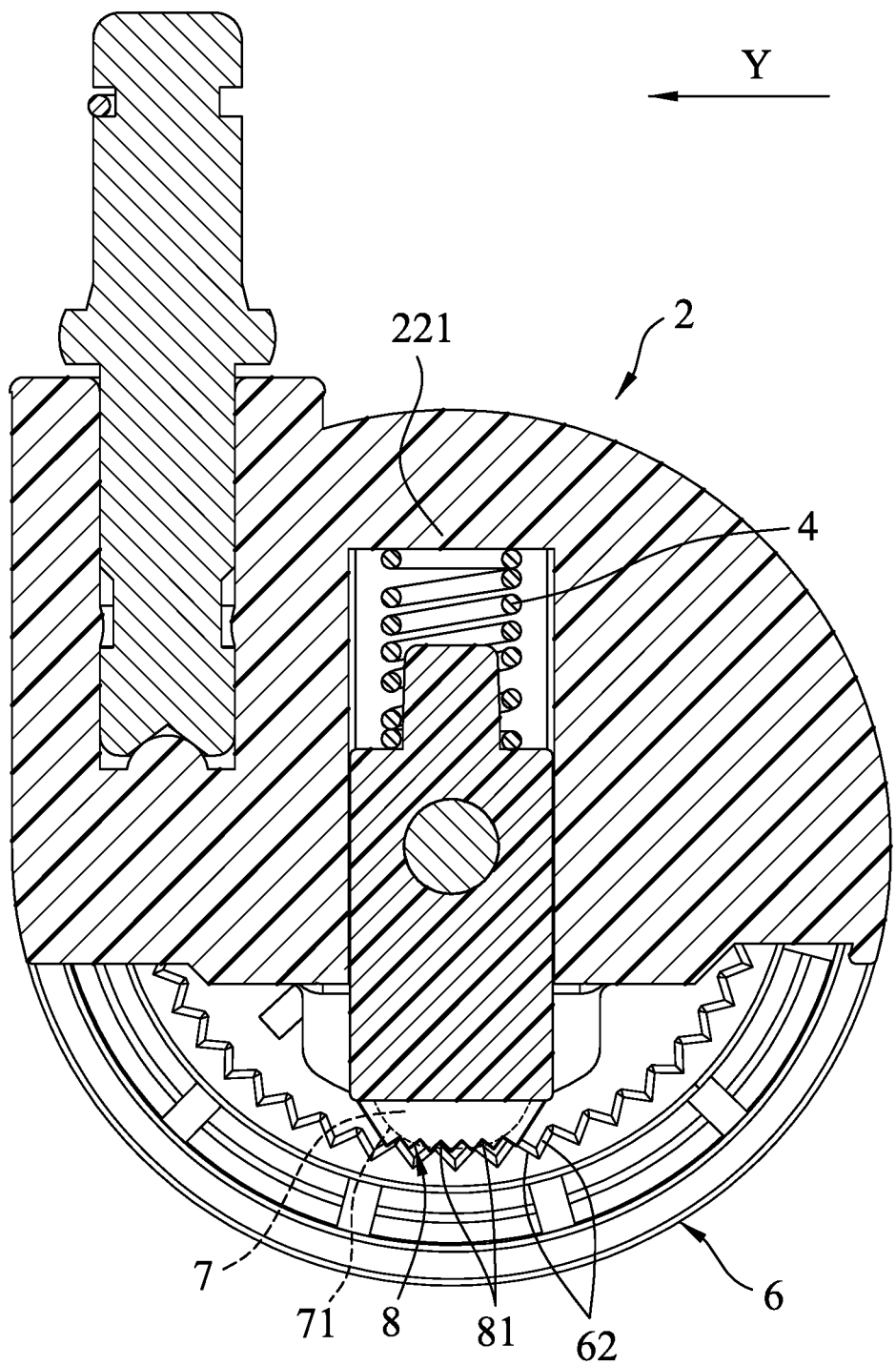
FIG. 5 is a side sectional view of the embodiment, illustrating the support unit in a stop position.

Referring to FIGS. 3 to 5, the support unit 2 is downwardly movable relative to the caster wheels 6 against a resilient force of the resilient member 4 from a released position to a stop position. When the support unit 2 is in the released position (see FIG. 4), due to the resilient force of the resilient member 4 pushing the support unit 2 upwardly relative to the caster wheels 6, each of the friction wheels 7 is spaced apart from the meshing teeth 62 of a respective one of the caster wheels 6, and the protruding teeth 81 of each of the protruding teeth units 8 are spaced apart from the meshing teeth 62 of the respective one of the caster wheels 6, such that the caster wheels 6 are freely rotatable for driving movement of the caster device. However, when the support unit 2 is pressed downwardly (e.g. due to the weight of a user), the resilient force of the resilient member 4 is suppressed by the downward force, such that the support unit 2 is moved to the stop position (see FIG. 5).

When the support unit 2 is in the stop position, the curved contact surface 71 of each of the friction wheels 7 is in frictional contact with the meshing teeth 62 of the respective one of the caster wheels 6, and the protruding teeth 81 of each of the protruding teeth units 8 are meshed with the meshing teeth 62 of the respective one of the caster wheels 6 to thereby impede the rotation of the caster wheels 6. To revert the support unit 2 from the stop position to the released position, one may simply remove the source of the downward force on the support unit 2, such that the resilient force 4 of the resilient member 4 may once again push the support unit 2 upwardly to re-enable rotation of the caster wheels 6. As the friction wheels 7 are made of rubber, the friction wheels 7 are able to restore into their original shapes when the support unit 2 is reverted back to the released position.

It is worth noting that, when the support unit 2 is at the released position, each of the friction wheels 7 has a bottom end lower than that of each of the protruding teeth units 8. As such, when the support unit 2 is moved from the released position to the stop position, the friction wheels 7 will always make frictional contact with the meshing teeth 62 of the caster wheels 6 before the protruding teeth units 8 contact the caster wheels 6. By the time the protruding teeth units 8 makes the contact, the friction wheels 7 would become slightly deformed to absorb some of the downward force, and to reduce the force the protruding teeth units 8 induce onto the meshing teeth 62, thereby prolonging the service life of the caster device.

Through the implementation of the friction wheels 7 and the protruding teeth units 8, alongside the protruding teeth 62 of the caster wheels 6, the caster device is operable to stop rotation of the caster wheels 6 when a load is supported. The friction wheels 7 and the protruding teeth units 8 would bear the downward force together so as to reduce wear and tear on the friction wheels 7 and the protruding teeth units 8. Moreover, the inclusion of the protruding teeth units 8 ensures that the meshing teeth 62 of the caster wheels 6 are well-meshed. Ultimately, the friction wheels 7 and the protruding teeth units 8 cooperate to increase the contact surface area with the meshing teeth 62 of the caster wheels 6 to further prevent rotation of the caster wheels 6.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A caster device comprising:
   a support unit;
   two caster wheels spaced apart along an axis (L) which extends in a left-right direction (X), and rotatably and respectively mounted to opposite lateral sides of said support unit, each of which is hollow and has
   an inner wheel surface that surrounds the axis (L), and
   a plurality of meshing teeth that are angularly arranged and that are formed on said inner wheel surface;
   a resilient member retained in said support unit for biasing said support unit upwardly;
   two friction wheels respectively mounted at bottoms of said opposite lateral sides of said support unit, and being respectively proximate to said inner wheel surfaces of said caster wheels; and
   two protruding teeth units being respectively adjacent to said friction wheels, each of said protruding teeth units including a plurality of protruding teeth that protrude downwardly;
   wherein said support unit is downwardly movable relative to said caster wheels against a resilient force of said resilient member from a released position, where each of said friction wheels is separated from said meshing teeth of a respective one of said caster wheels and where said protruding teeth of each of said protruding teeth units are separated from said meshing teeth of the respective one of said caster wheels, to a stop position, where each of said friction wheels is in frictional contact with said meshing teeth of the respective one of said caster wheels and where said protruding teeth of each of said protruding teeth units are meshed with said meshing teeth of the respective one of said caster wheels to thereby impede the rotation of said caster wheels.

2. The caster device as claimed in claim 1, wherein said protruding teeth of each of said protruding teeth units are arranged in a front-rear direction (Y) perpendicular to the left-right direction (X).

3. The caster device as claimed in claim 1, wherein said protruding teeth units are disposed between said friction wheels.

4. The caster device as claimed in claim 1, wherein said protruding teeth units and said support unit are molded as one piece.

5. The caster device as claimed in claim 1, wherein each of said friction wheels is made of rubber, and has a curved contact surface for contacting said meshing teeth of the respective one of said caster wheels when said support unit is at the stop position.

6. The caster device as claimed in claim 1, wherein:
said support unit includes
- a coupling portion having a top wall, and
- two lateral walls that extend downwardly and respectively from lateral ends of said top wall and that cooperate with said top wall to define a coupling groove facing downwardly;

said caster device further comprises a connecting member inserted upwardly into said coupling groove; and said resilient member is retained between said connecting member and said top wall.

7. The caster device as claimed in claim 6, wherein:
each of said lateral walls of said coupling portion is formed with an extension hole that extends therethrough in the left-right direction (X); and said connecting member is formed with a through hole that is registered with said extension holes; and said caster device further comprises a wheel axle that extends through said extension holes and said through hole, and that has two opposite ends that are connected respectively to said caster wheels.

8. The caster device as claimed in claim 1, wherein each of said friction wheels has a bottom end lower than that of each of said protruding teeth units when said support unit is at the released position.

* * * * *